(12) United States Patent
Sloss

(10) Patent No.: US 9,019,795 B2
(45) Date of Patent: Apr. 28, 2015

(54) METHOD OF OBJECT TRACKING USING SONAR IMAGING

(75) Inventor: Martyn Sloss, Fife (GB)

(73) Assignee: Codaoctopus Group, Lakeland, FL (US)

( * ) Notice: Subject to any disclaimer, the term of this patent is extended or adjusted under 35 U.S.C. 154(b) by 451 days.

(21) Appl. No.: 13/603,723

(22) Filed: Sep. 5, 2012

(65) Prior Publication Data

US 2014/0064033 A1 Mar. 6, 2014

(51) Int. Cl.
*G01S 15/89* (2006.01)
*G01S 7/62* (2006.01)
*G01S 15/66* (2006.01)

(52) U.S. Cl.
CPC ............... *G01S 15/89* (2013.01); *G01S 7/6245* (2013.01); *G01S 15/66* (2013.01)

(58) Field of Classification Search
CPC ................................ G01S 7/6245; G01S 15/89
USPC ...................................................... 367/11, 88
See application file for complete search history.

(56) References Cited

U.S. PATENT DOCUMENTS

| | | | | |
|---|---|---|---|---|
| 7,489,592 B2* | 2/2009 | Hansen | ............................ | 367/96 |
| 7,898,902 B2* | 3/2011 | Sloss | ................................. | 367/7 |
| 8,059,486 B2* | 11/2011 | Sloss | ................................. | 367/88 |
| 8,854,920 B2* | 10/2014 | Sloss | ................................. | 367/88 |
| 2005/0007882 A1* | 1/2005 | Bachelor et al. | ............... | 367/103 |
| 2006/0072375 A1* | 4/2006 | Nishimori et al. | ............. | 367/111 |
| 2007/0159922 A1* | 7/2007 | Zimmerman et al. | ........ | 367/103 |
| 2008/0043572 A1* | 2/2008 | Hansen | ............................ | 367/11 |
| 2008/0130413 A1* | 6/2008 | Bachelor et al. | ............... | 367/103 |
| 2008/0198694 A1* | 8/2008 | Hansen | ............................ | 367/96 |
| 2009/0310438 A1* | 12/2009 | Sloss | ................................. | 367/7 |
| 2011/0110194 A1* | 5/2011 | Sloss | ................................. | 367/88 |
| 2012/0099395 A1* | 4/2012 | Debrunner et al. | ............. | 367/21 |
| 2012/0099400 A1* | 4/2012 | Debrunner et al. | ............. | 367/99 |
| 2012/0099402 A1* | 4/2012 | Debrunner et al. | ........... | 367/134 |
| 2014/0064032 A1* | 3/2014 | Sloss | ................................. | 367/88 |
| 2014/0064033 A1* | 3/2014 | Sloss | ................................. | 367/107 |

* cited by examiner

*Primary Examiner* — Daniel Pihulic
(74) *Attorney, Agent, or Firm* — Rodney T Hodgson

(57) ABSTRACT

An object is measured to record the relative surface coordinates. Then, a portion of the object "the front side" immersed in a fluid is imaged by directing a sonar pulse at the object and recording sonar signals reflected from the object with a sonar imaging array. Then, the recorded relative surface coordinates are iteratively fit to coordinates calculated from the sonar image. Thereafter, the coordinates of the surface of the "backside" of the object that is not observable in the sonar image are known, and a computer generated image of the backside is stitched to sonar image so that the object can be viewed from a plurality of viewpoints separated from the sonar imaging array.

13 Claims, 6 Drawing Sheets

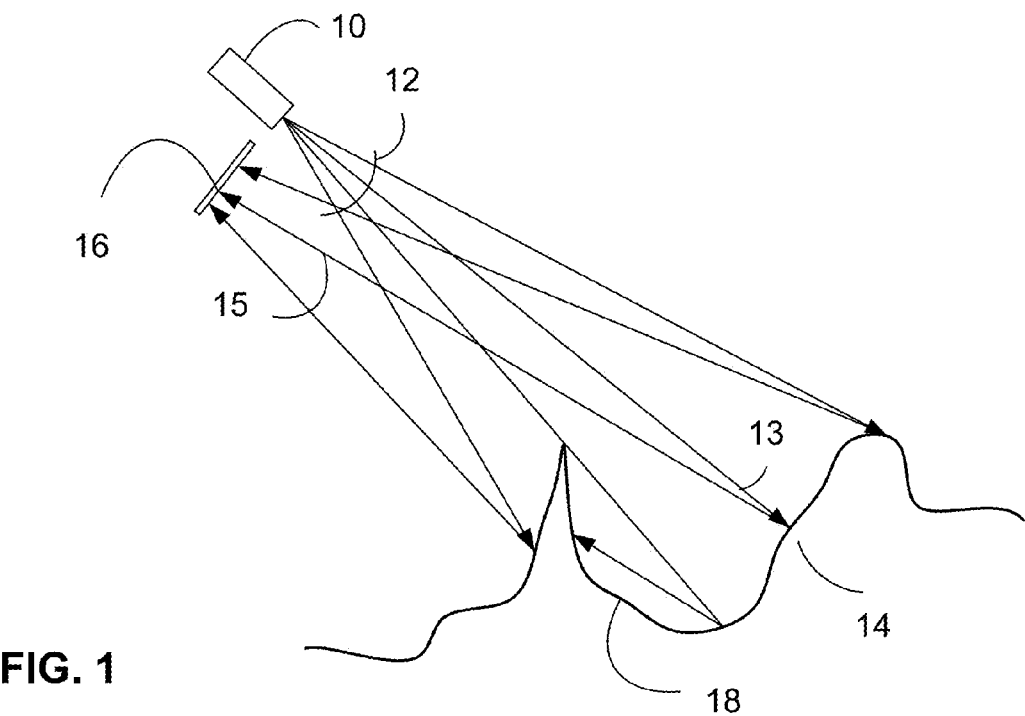
FIG. 1
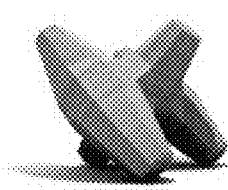 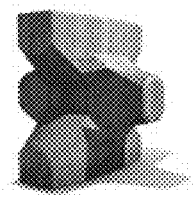  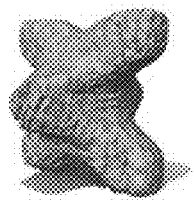
FIG. 2A  FIG. 2B  FIG. 2C  FIG. 2D

METHOD OF OBJECT TRACKING USING SONAR IMAGING

RELATED PATENTS AND APPLICATIONS

The following US patents and US patent applications are related to the present application: U.S. Pat. No. 6,438,071 issued to Hansen, et al. on Aug. 20, 2002, and entitled "Method for producing a 3D image"; U.S. Pat. No. 7,466,628 issued to Hansen on Dec. 16, 2008; U.S. Pat. No. 7,489,592 issued Feb. 10, 2009 to Hansen and entitled "Patch test for 3D sonar data"; U.S. Pat. No. 8,059,486 Sloss on Nov. 15, 2011 and entitled "Method of rendering volume representation of sonar images"; U.S. Pat. No. 7,898,902 issued to Sloss on Mar. 1, 2011 and entitled "Method of representation of sonar images". A US patent application entitles "Method of rendering volume representation of sonar images", filed on the same day as the present invention by the inventor of the present invention, is also related to the present application The above identified patents and patent applications are assigned to the assignee of the present invention and are incorporated herein by reference in their entirety including incorporated material.

FIELD OF THE INVENTION

The field of the invention is the field of sonar imaging and control.

OBJECTS OF THE INVENTION

It is an object of the invention to produce a sonar image of an object immersed in a fluid, wherein a portion of the surface of the object which is either not irradiated by the sonar source or not in the field of view of a sonar imaging array is imaged on an image receiving device.

It is an object of the invention to produce a sonar image of an object immersed in a fluid together with a sonar image of background objects which are in the sonar shadow of the object.

It is an object of the invention to translate and rotate an object to fit a portion of the object which is not directly observable with a sonar imaging device into an object receiving aperture formed by at least one background object.

SUMMARY OF THE INVENTION

An object is measured to record the relative surface coordinates. Then, a portion of the object "the front side" immersed in a fluid is imaged by directing a sonar pulse at the object and recording sonar signals reflected from the object with a sonar imaging array. Then, the recorded relative surface coordinates are iteratively fit to coordinates calculated from the sonar image. Thereafter, the coordinates of the surface of the "backside" of the object that is not observable in the sonar image are known, and a computer generated image of the backside is stitched to sonar image so that the object can be viewed from a plurality of viewpoints separated from the sonar imaging array. In particular, the object can be made to rotate on a viewing screen to give a much enhanced three dimensional view. In addition, before the object is moved into position, a three dimensional sonar image of background objects is recorded. Then, when the object moved into place in front of the background objects, the background objects shadowed by the object can be represented by stitching a calculated image on to the sonar image of the object and background. Again, as the viewpoint is changed, the background of the object is reconstructed and presented to the viewer. The object can then be rotated and translated to fit into the background objects under computer control or under control of an operator or a robotic machine visualizing the relative position of the object and background objects.

BRIEF DESCRIPTION OF THE DRAWINGS

FIG. 1 shows a sketch of a sonar source sending sonar wave to a surface and a sonar array receiving device receiving reflected sonar signals from the surface.

FIGS. 2A-2D show images of different cast blocks used for breakwaters.

DETAILED DESCRIPTION OF THE INVENTION

Figure 3:
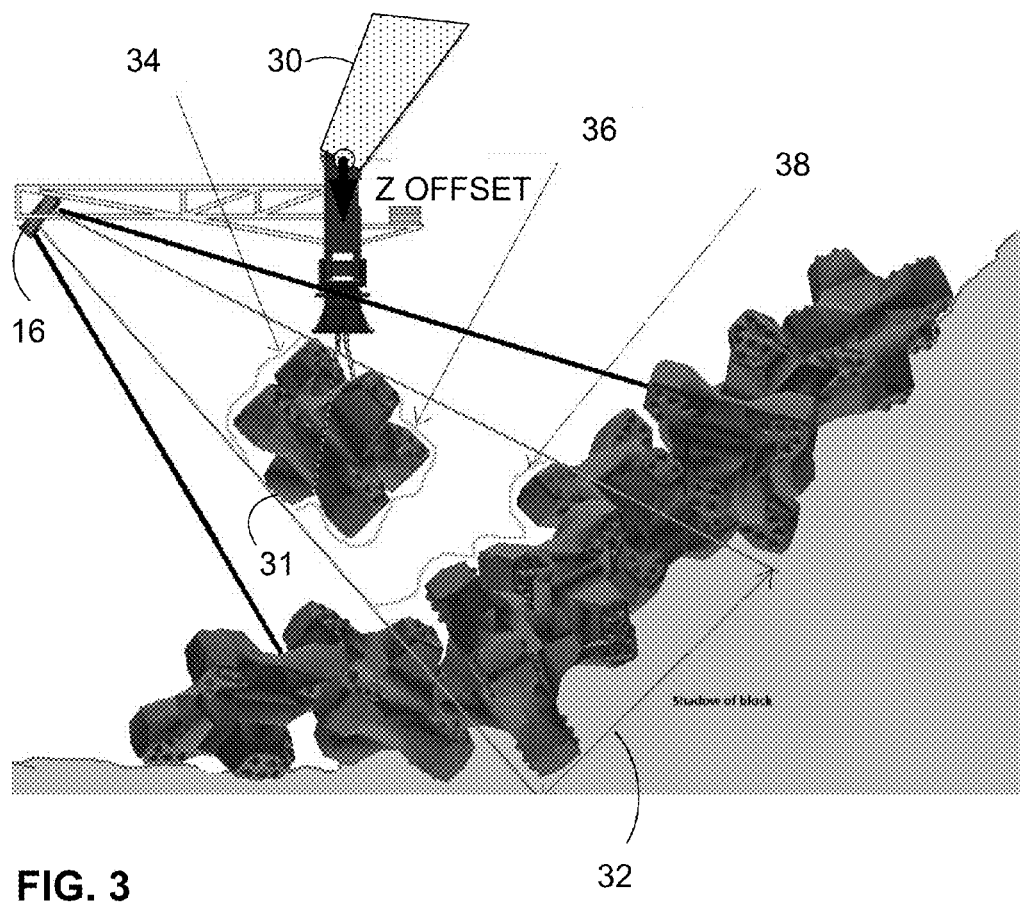
FIG. 3 shows a sketch of an excavator arm carrying a suspended block for placement in a breakwater.

Optical inspection of objects in a fluid is often not possible because of smoke and fog in air, for example, or turbidity in water or other fluid. Sonar imaging of such objects is often used. However, if objects are to be placed, grasped, or moved in the fluid, a typical sonar image taken from a single point of view is not sufficient. The "backside" of the object is not viewable, nor is the background of the object in the "sonar shadow" viewable.

FIG. 1 shows a typical sonar imaging set up, where a source 10 projects an outgoing sound wave noted as a wave front 12. The sound wave can be traced as a ray 13 which strikes a sonar reflecting surface 14 and is reflected as ray 15 to a sonar imaging array 16. If an object, or part of the background, stops the sound waves from striking a region 18, the no data is collected from the region and so it is not imaged and is said to be in a "sonar shadow". A sonar imaging array, such as an Echoscope® from CodaOctopus Inc., comprises an array of microphones which send signals representing the sound waves to electronics and a computer system for analysis. The sonar signal 10 will be a "ping" of duration milliseconds to microseconds. a typical sonar ping will be, say, 70 microseconds in duration and have a frequency of 300-1000 MHz. Each microphone of the array receives a reflected sonar signal of the frequency of the sound wave sent out from the source, but with differing phases. The signal from an object nearer to the imaging array will arrive sooner that a signal from objects in the background, and a filter, for example a time window, can be used to sort out the signals from the different parts of the object and background. The signal is digitally sampled at a rate higher than the frequency of the sound wave, and the amplitude and phase of the signals are recorded. The device works very much like an interferometric imaging device where the intensity and phase of the light are measured. From the measured signals, the range of the various parts of the object from the imaging array can be calculated and the image may be displayed, for example on an optical imaging device or stored in a computer accessible data storage device for further manipulation. A typical imaging device would be a computer monitor, where the image is shown with the "height" of the different parts of the image shown as differing colors. We define this type of image herein as a three dimensional (3D) image. Another type of image would be an image where the surfaces are shaded to give the impression of light and shade which also can be interpreted by a human observer as a 3D image. Another type of 3D image is an image which appears to shift as the viewpoint is shifted, which serves very well to show up the range differences by parallax. Another type of 3D image is the familiar topographic map image, where the regions of equal height are connected with lines. All images where a third dimension can be read on a two dimensional image display are anticipated by the inventor.

When building a breakwater, the top (armor) layer is usually made with large heavy concrete blocks. These blocks must be placed sufficiently densely so as to minimize gaps between them to stop the egress of the underlying layers, and must be sufficiently heavy so as not to be moved by the action of waves and tides. Traditionally two layers of boulders, or in most cases cubic concrete blocks have been used. In order to reduce the amount of material required a new approach was introduced, where complex geometric volumes with overlapping parts were chosen. This allows only one layer of armor to be used while still meeting the minimum gap requirement. Photographs of typical blocks are shown in FIGS. 2A-2D. These blocks are generally made from concrete cast in steel molds, and may be several meters high and weigh many tons. The advantage of the Echoscope® data is that as it is three dimensional (3D), the virtual eye-point can be moved when displaying the data to give the user a better overview of the scene.

FIG. 3 shows a sketch of an excavator arm 30 carrying a suspended block 31 for placement in a breakwater. The angular portion 32 of the ensonified region of the background behind the block 31 is called a "sonar shadow", and the portion of the background 38 does not receive sound waves and is "invisible" to the detector 16. One advantage of the 3D visualization made possible by the 3D sonar detector is that the view point of the images drawn may be moved to take advantage of the human recognition of parallax to give the $3^{rd}$ dimensional image information.

Figure 4A:
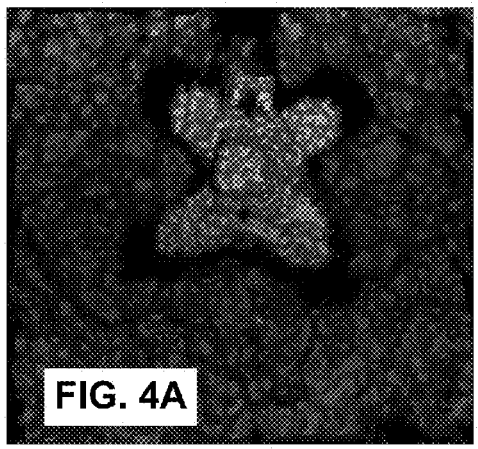
FIG. 4A shows a sonar image of a block casting a shadow against a background.
Figure 4B:
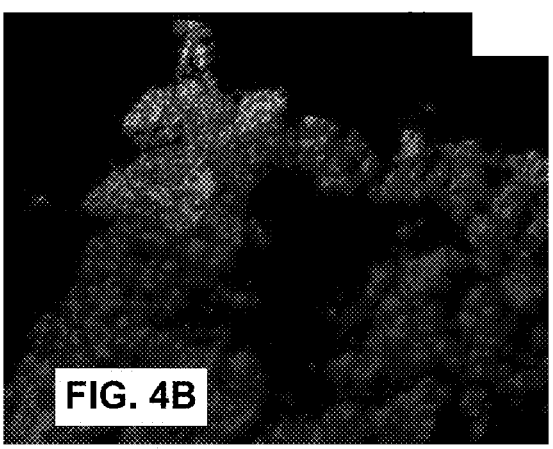
FIG. 4B shows a sonar image of the data of FIG. 4A shown from a different viewpoint.

As the Echoscope® itself is fixed with respect to the scene, this virtual movement makes the shadowing effect more apparent. When the image shown from a viewpoint apart from the sonar array 16 as in FIG. 4B, the points corresponding to the backside of the block are missing and the block appears truncated.

Figure 4C:
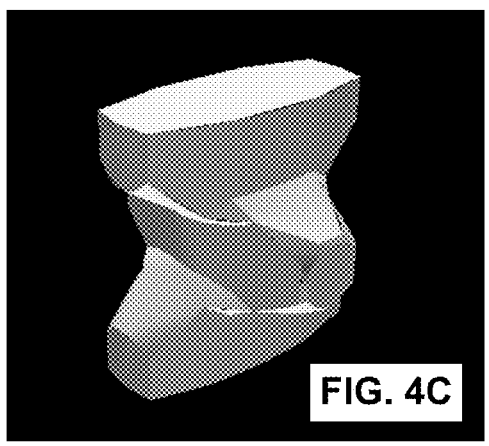
FIG. 4C shows a non-sonar image of a model block.
Figure 4D:
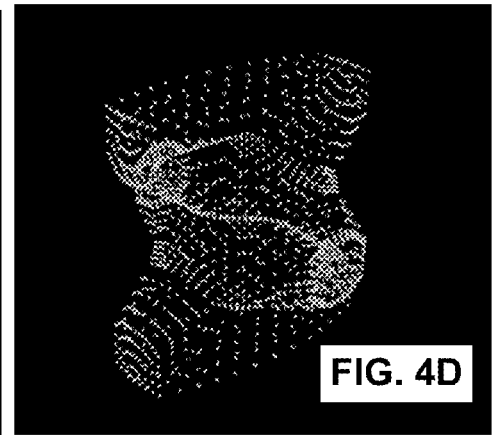
FIG. 4D shows a set of points on the surface of the model of FIG. 4C.
Figure 4E:
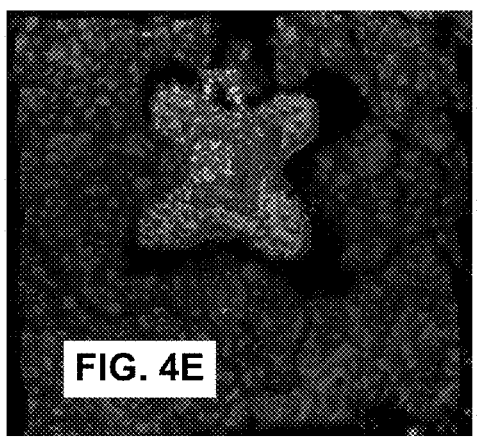
FIG. 4E shows the image of FIG. 4A combined with an image of a model of the block wherein the set of points of FIG. 4D have been fit to points measured from the data of FIG. 4A to give the orientation of the model of FIG. 4C.
Figure 4F:
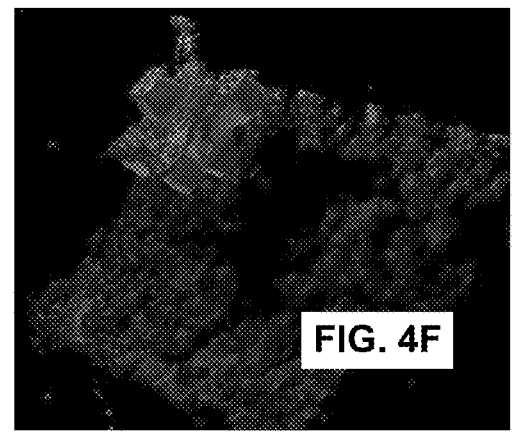
FIG. 4F shows the combined image of FIG. 4E taken from the viewpoint of FIG. 4B.

In order to show the backside of the block as the eyepoint is moved around, we obtain the data on the relative coordinates of the surface of the block, and construct a model of the block in the computer as in FIG. 4C. The coordinates of the model are best taken from the machine drawings of the mold for the block, but any measurement of the surface of the block may be used. The data may be stored as a set of x, y, z coordinates detailing the entire surface of the block, or a subset of the data may be stored if there are symmetries like reflection in a plane or rotation about an axis. In general, more of the surface must be measured than can be viewed from a single viewpoint by the sonar system. Generally, the entire surface of the block is measured. The center of mass of the block is determined by calculation from the measured surface, or by measurement. In order to track and align the model with the data, a set of points such as sketched in FIG. 4D are created based on the vertices and faces of the 3D model. These points are then aligned with the data points using a recognized image matching technique such as 'Iterated Closest Point' (ICP). Many other methods of finding the best fit between sets of points in three dimensions could be used. FIG. 4E shows the data of FIG. 4A overlaid on to an image of the model aligned with the sonar data. FIG. 4F shows data from the viewpoint of FIG. 4B with the model drawn in where the sonar data is missing.

Figure 5A:
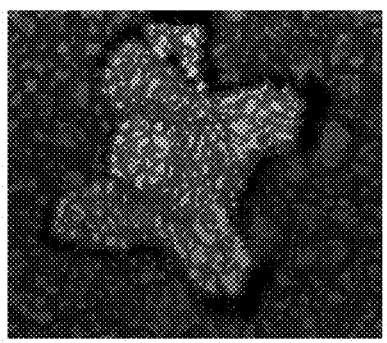
FIGS. 5A-5F show sonar images of a block and images chosen from a model of the block in the steps of finding orientation of the model which will be the same as the orientation of the block.
Figure 5B:
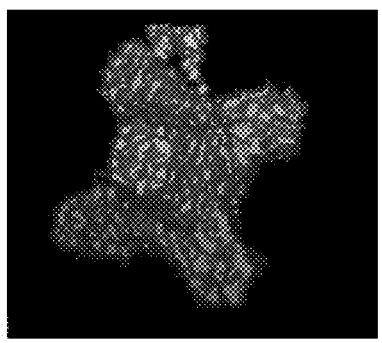
Figure 5C:
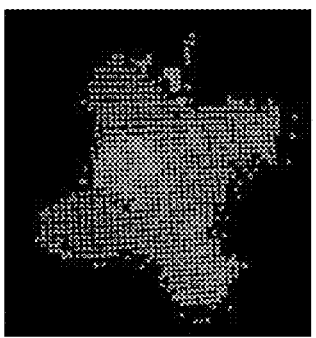

The ICP algorithm and other point matching algorithms require a time proportional to the number n of points in the first set of points to be matched times the number m of points in the second set of points. This time proportional to n×m may be reduced to n log m by reducing the set of points from the model to just those points which could be seen from an Echoscope®. FIG. 5A shows the Echoscope® data with the data from the background. FIG. 5B shows the data of FIG. 5A where the background has been set to zero. FIG. 5C is the sonar data of FIG. 5B reduced to a set of coordinate points.

Figure 5D:
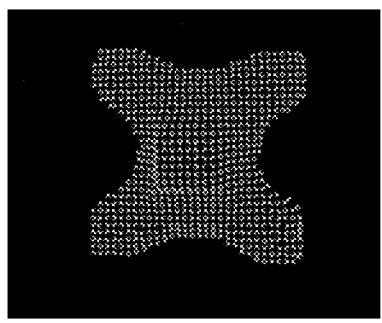
Figure 5E:
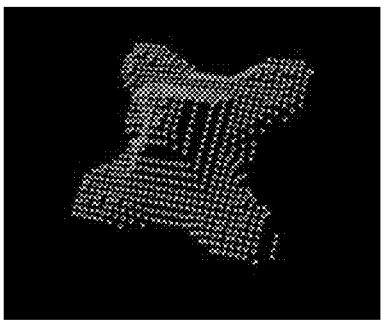
Figure 5F:
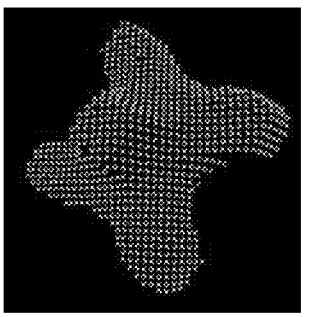
Figure 6A:
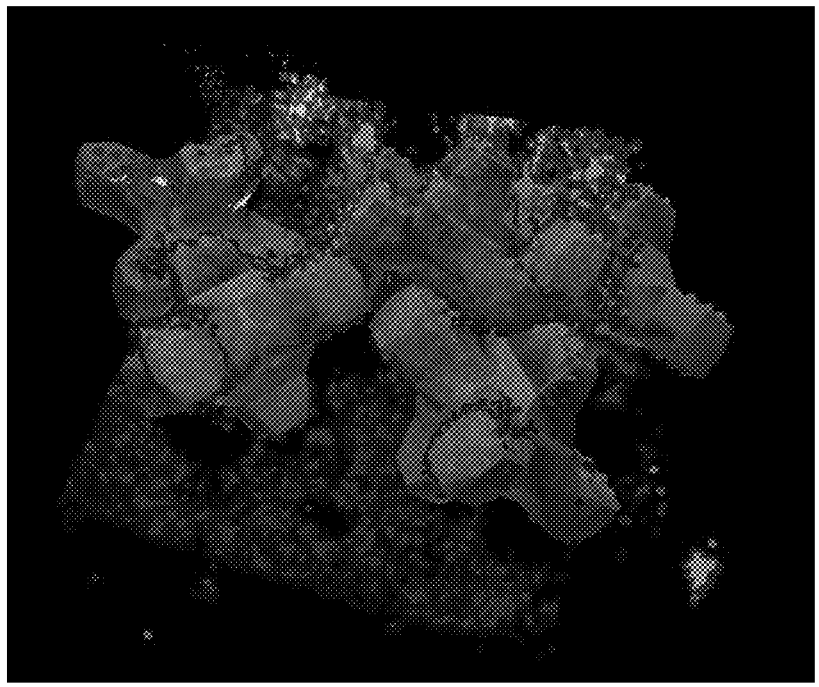
FIG. 6A shows a background image of models of prepositioned blocks.
Figure 6B:
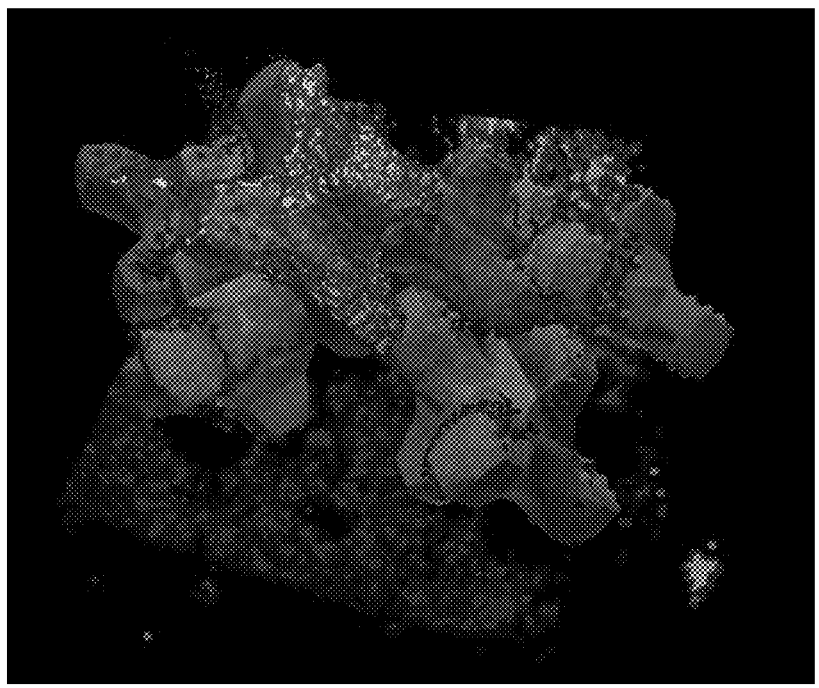
FIG. 6B shows model of a new block positioned among the blocks of FIG. 6A.
Figure 7A:
FIGS. 7A and 7B show photographs of portions of breakwaters above water level.
Figure 7B:
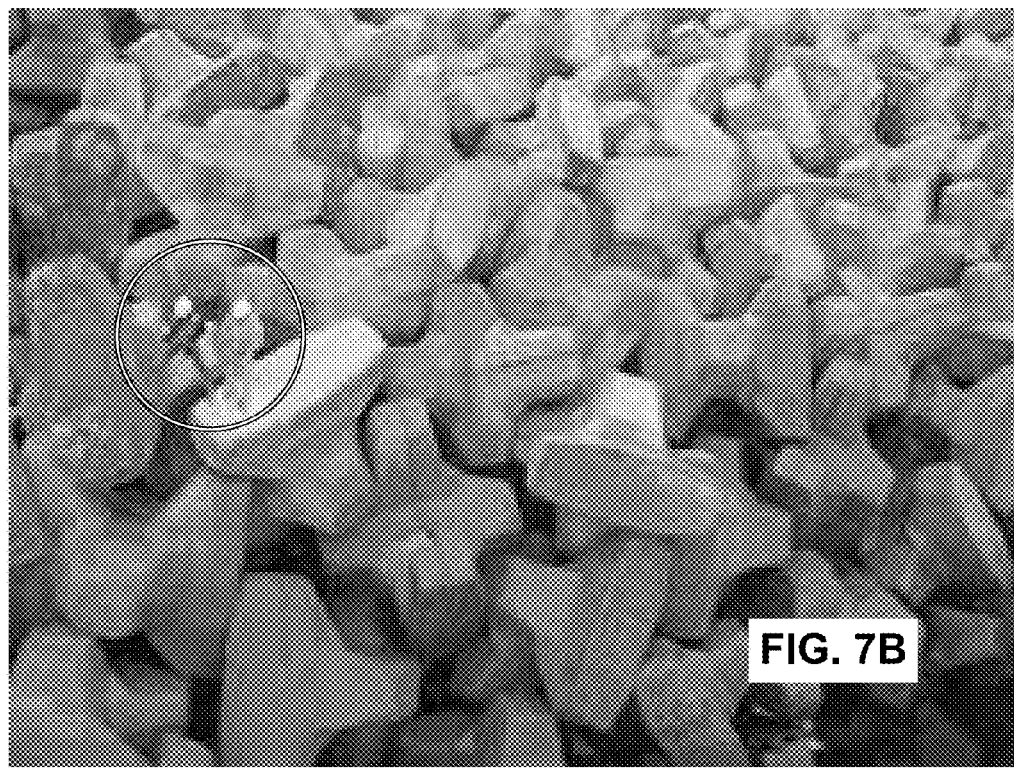

FIG. 5D shows one of a small (<20) set of points representing a part of the surface of the block, which are iteratively matched to the points of FIG. 5C to find the tilt and rotation needed to bring the model into matching position FIG. 5E with the block. FIG. 5E shows the rotated and tilted points used in FIG. 5D. Note that some points in FIG. 5D would not be seen, and can be removed to give a set of points as in FIG. 5F. Once the orientation of the block has been roughly calculated, some points are removed as they are not visible, and other and points that come into view upon the rotation are added, to further match the model orientation with the sonar data from the object as in FIG. 5F. This process is repeated with each of the small set of points, and the best match chosen to give the best orientation of the model to the block Now, the orientated model image is added to the sonar data to provide views of the backside of the object as in FIG. 4F. The total time taken to match the model points to the sonar points is much less when matching each of the small set of points and using the best match than using all the data points from the model.

Before the first block in a set of blocks is laid, a sonar image of the background is recorded. The position and orientation of the sonar source and sonar imaging device are recorded, so that the "background" of the sonar shadow can be filled in when the block is moved into place. The orientation of the block is known after it is placed, and the "image" of the block can be added to the background. As the blocks are placed, the position, orientation, etc. of each block is recorded so that the entire background may be matched.

The block is moved into position to place it in a location and orientation with respect to the other blocks. The location and orientation must satisfy a criterion. One such criterion is that each block is supported by contact of at least three contact points with other blocks.

As the block is being moved and rotated, the movement and rotation is slow compared to the rate at which sonar images are recorded. The velocity and rotation of the block is measured by measuring the location of the excavator arm and the distance from the excavator arm to the block, and measuring the rotation of the block from ping to ping. The position and rotation of the block is predicted at the time of the next ping, and and the previous set of points for matching model to sonar image is adjusted take into account the new position and rotation angle, so the iterative process of matching takes much less time. Much less time is then used to track the block accurately. For example, a set of points along one edge of the block can disappear, while another set of points on the opposite edge swings into view.

In viewing the block and background in the sonar image, the background can also be enhanced by using previously recorded orientations and positions to "draw in" the previously placed blocks. The sonar data is then much easier to understand, especially when the eyepoint is rotated back and forth to give enhanced 3D visualization.

A skilled excavator operator using the Echoscope® can place many more blocks at a rate much higher than had previously been possible using optical cameras and or divers. Of course, a computer is even better at 3D visualization that a human excavator operator. The computer can itself plot a course wherein the block is rotated and translated to its optimal place. The computer remembers the surfaces of all the other blocks "in the way" and can maneuver the various projections of the block around the projections of the other blocks to make a better and more secure fit. The author anticipates that the entire process can be carried out by the computer with no more input from an operator than checking the image screens.

Obviously, many modifications and variations of the present invention are possible in light of the above teachings. It is therefore to be understood that, within the scope of the appended claims, the invention may be practiced otherwise than as specifically described.

I claim:

1. A method of tracking an object in a fluid, comprising:
   a) recording a first set of three dimensional points representing of a first portion of the surface of the object, the first set of three dimensional points recorded in computer readable media;
   b) directing sound waves from a source towards at least a second portion of the surface of the object, wherein the object is immersed in a fluid, the sound waves directed at a time $t_1$; then
   c) receiving sound waves reflected from the second portion of the surface with a two dimensional sonar receiving array, wherein the sonar receiving array communicates signals measuring the reflected sound waves to a computer readable recording device, and wherein the first and second portions of the surface have at least one overlap region; then
   d) constructing a second set of three dimensional points representing the surface of the second portion of the surface of the object from the signals recorded on the computer readable recording device; then
   e) iteratively matching the first set of points to the second set of points; then
   f) displaying a three dimensional sonar image of the second portion of the surface combined with a three dimensional image of a third portion of the surface of the object, the three dimensional image of the third portion of the surface calculated the first set of points, wherein the third portion of the surface is included in the first portion of the surface and not part of the second portion of the surface.

2. The method of claim 1, further comprising;
   g) displaying a background sonar image of a background behind the image displayed in step f), wherein the background sonar image is recorded before step c).

3. The method of claim 2, wherein step g) comprises displaying sequential images on an image display device, the sequential images comprising images of the mode and background seen from a plurality of points of view different from the position of the sonar receiving array.

4. The method of claim 2, wherein step g) comprises displaying an image of the object and background on a 3D imaging device, wherein two separate images constructed from two different points of view are presented to two eyes of a human observer.

5. The method of claim 1, further comprising rotating and translating the object to bring the object into contact with at least one background object, wherein the fit between the object and the at least one background object satisfies a criterion.

6. A method of tracking an object in a fluid, comprising:
   a) recording relative coordinates of at least a first portion of the surface of the object and creating a model of the first portion of the surface; then
   b) constructing a first set of three dimensional points representing the first portion of the surface of the model;
   c) directing sound waves from a source towards at least a second portion of the surface of the object, wherein the object is immersed in a fluid, the sound waves directed at a time $t_1$; then
   d) receiving sound waves reflected from the second portion of the surface with a two dimensional sonar receiving array, wherein the sonar receiving array communicates signals measuring the reflected sound waves to a computer readable recording device, and wherein the first and second portions of the surface have at least one overlap region; then
   f) constructing a second set of three dimensional points representing the surface of the second portion of the surface of the object from the recorded signals of the computer readable recording device; then
   g) estimating the orientation of the model to the object;
   h) choosing a third set of points to be the points of the first set of points which would be seen by a sonar image of the model estimated be in the orientation of step g); and
   i) iteratively matching the second set of points with the third set of points; then
   j) displaying a three dimensional sonar image of the second portion of the surface combined with an image of a third portion of the surface of the object calculated from the model, wherein the third portion of the surface is included in the first portion of the surface and not part of the second portion of the surface.

7. The method of claim 6, further comprising;
   k) repeating steps c)-j) at time $t_2$,
   l) estimating rotational and translational velocities of the object from the differences in orientation and position measured at times $t_1$ and $t_2$;
   m) estimating the position of the object at time $t_3$ from the position measured at time earlier than $t_3$ and the estimated rotational and translational velocities of the object;
   o) repeating steps c)-j) at time $t_3$, where step g) uses the results of step m).

8. The method of claim 6, wherein step g) uses the vertical line through the known center of mass of the object and a measured height of the center of mass of the object with respect to the source and/or the two dimensional sonar recording array.

9. The method of claim 6, further comprising;
k) displaying a background sonar image of a background behind the image displayed in step j), wherein the background sonar image is recorded before step c).

10. The method of claim 9, wherein step k) comprises displaying sequential images on an image display device, the sequential images comprising images of the model and background seen from a plurality of points of view different from the position of the sonar receiving array.

11. The method of claim 9, wherein step k) comprises displaying an image of the object and background on a 3D imaging device, wherein two separate images constructed from two different points of view are presented to two eyes of a human observer.

12. The method of claim 6, further comprising rotating and translating the object to bring the object into contact with at least one background object, wherein the fit between the object and the at least one background object satisfies a criterion.

13. A method of tracking an object in a fluid, comprising:
a) recording a first set of three dimensional points representing of a first portion of the surface of the object, the first set of three dimensional points recorded in computer readable media;
b) directing sound waves from a source towards a background surface, wherein the background surface is immersed in a fluid; then
c) receiving sound waves reflected from the background surface with a two dimensional sonar receiving array, wherein the sonar receiving array communicates signals measuring the reflected sound waves to a computer readable recording device; then
d) constructing a model of the background surface;
e) moving the object into a position between the background surface and the source and/or the sonar receiving array;
and wherein the first and second portions of the surface have at least one overlap region
f) directing sound waves from a source towards at least a second portion of the surface of the object, wherein the object is immersed in a fluid, and wherein the sound waves are directed at a time $t_1$; then
g) receiving sound waves reflected from the second portion of the surface with a two dimensional sonar receiving array, wherein the sonar receiving array communicates signals measuring the reflected sound waves to a computer readable recording device, and wherein the first and second portions of the surface have at least one overlap region; then
h) constructing a second set of three dimensional points representing the surface of the second portion of the surface of the object from the recorded signals; then
i) iteratively matching the first set of points to the second set of points; then
j) translating and rotating the object to fit the object into the background surface, wherein the fit satisfies a criterion.

* * * * *